(12) United States Patent
Jokele et al.

(10) Patent No.: US 7,986,244 B2
(45) Date of Patent: Jul. 26, 2011

(54) DEVICE AND METHOD FOR DISPLAYING MEASURING VALUES AS WELL AS SHRINK TUNNEL FOR A PACKAGING MACHINE AND PACKAGING MACHINE COMPRISING SUCH A DEVICE, RESPECTIVELY

(75) Inventors: Bernd Jokele, Kempten (DE); Konrad Mossnang, Kempten (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 357 days.

(21) Appl. No.: 12/150,778

(22) Filed: Apr. 29, 2008

(65) Prior Publication Data
US 2008/0278340 A1 Nov. 13, 2008

(30) Foreign Application Priority Data
Apr. 30, 2007 (DE) .................. 10 2007 020 392

(51) Int. Cl.
*G08B 21/00* (2006.01)
(52) U.S. Cl. .................. 340/679; 340/815.47; 340/540; 340/584; 702/155
(58) Field of Classification Search ................. 340/945, 340/967, 964, 973, 974, 979, 815.47, 540, 340/584; 374/100; 514/44; 435/27, 6; 702/155; 53/434
See application file for complete search history.

(56) References Cited

U.S. PATENT DOCUMENTS

| | | | |
|---|---|---|---|
| 3,377,770 A | 4/1968 | Rorer | |
| 4,472,921 A | 9/1984 | Jones | |
| 4,567,713 A * | 2/1986 | Natterer | 53/433 |
| 4,685,073 A | 8/1987 | Acker | |
| 4,768,706 A | 9/1988 | Parfitt | |
| 4,789,824 A * | 12/1988 | Henkelmann | 324/114 |
| 5,309,919 A * | 5/1994 | Snell et al. | 600/510 |
| 5,422,625 A * | 6/1995 | Sakaemura | 340/461 |
| 5,621,382 A * | 4/1997 | Yamamoto | 340/432 |
| 6,497,297 B1 * | 12/2002 | Ebert et al. | 180/170 |
| 7,262,689 B2 * | 8/2007 | Kolpasky | 340/461 |
| 7,501,939 B1 * | 3/2009 | Belikov et al. | 340/438 |
| 7,570,153 B2 * | 8/2009 | Gorman et al. | 340/323 R |
| 2002/0062189 A1 * | 5/2002 | Kannonji | 701/96 |
| 2002/0092841 A1 * | 7/2002 | Vetrano | 219/393 |
| 2003/0074158 A1 | 4/2003 | Hayashi et al. | 702/145 |
| 2004/0139701 A1 * | 7/2004 | Cady et al. | 53/434 |
| 2004/0142377 A1 * | 7/2004 | Unett et al. | 435/7.1 |
| 2004/0262410 A1 | 12/2004 | Hull | |
| 2005/0021245 A1 * | 1/2005 | Furuno et al. | 702/33 |
| 2005/0168331 A1 * | 8/2005 | Gunderson | 340/468 |

(Continued)

FOREIGN PATENT DOCUMENTS

DE 2333070 2/1974

(Continued)

Primary Examiner — George A Bugg
Assistant Examiner — Hoi C Lau
(74) Attorney, Agent, or Firm — Brooks Kushman P.C.

(57) ABSTRACT

A device for displaying measuring values is provided, comprising a device for displaying measuring values having a control unit (22) and having a digital display unit (21), which is controlled by the control unit (22), wherein the control unit (22) is embodied in such a manner that a measuring value detected by the measuring value detection unit are displayed on the display unit (21) as actual value (I) and as a preset set value (S) in such a manner that the position of the actual value (I) relative to the set value (S) is a function of the difference between the set value and the actual value.

12 Claims, 3 Drawing Sheets

U.S. PATENT DOCUMENTS

Figure 1:
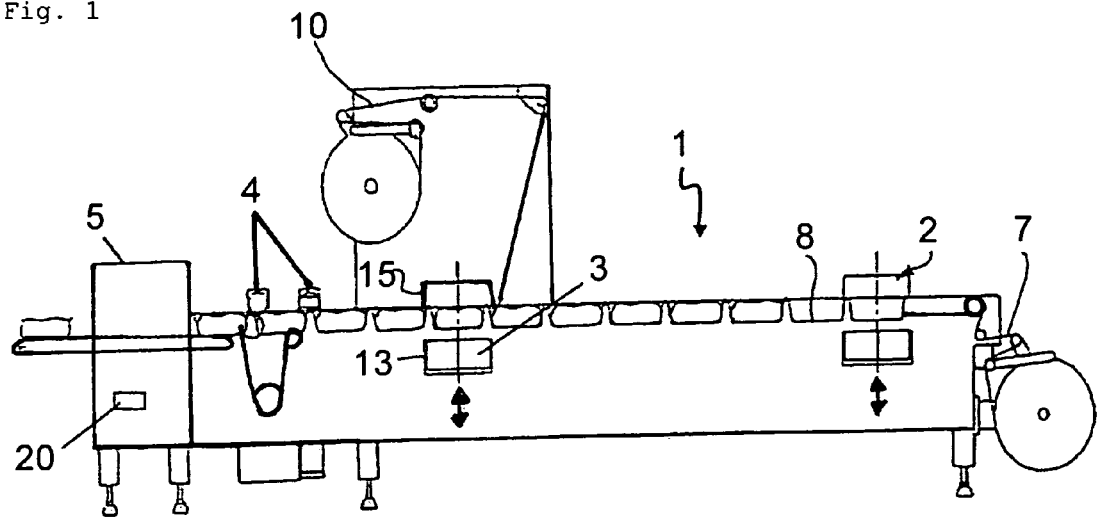

| | | | |
|---|---|---|---|
| 2006/0050764 A1* | 3/2006 | Huang et al. | 374/100 |
| 2006/0173650 A1* | 8/2006 | Ebihara | 702/155 |
| 2007/0021365 A1* | 1/2007 | Erler et al. | 514/44 |
| 2007/0045444 A1 | 3/2007 | Gray et al. | |
| 2008/0075143 A1* | 3/2008 | Lampke-Honeyghan et al. | 374/164 |

FOREIGN PATENT DOCUMENTS

| | | |
|---|---|---|
| DE | 3412297 | 10/1985 |
| GB | 1 396 236 | 6/1975 |
| JP | 11-227714 | 8/1999 |
| NL | 1 013 038 | 3/2001 |

* cited by examiner a)

c)

b)

a)

```
75>>>>>>>>>>>90
76>>>>>>>>>>>90
77>>>>>>>>>>>90
78>>>>>>>>>>90
``` b)

```
70>>>>>>>>>90
71>>>>>>>>>90
72>>>>>>>>90
73>>>>>>>>90
``` c)

```
90<<<<<<<<<80
90<<<<<<<<81
``` d)

```
1000>>>>>>>>>50
700>>>>>>>>>50
450>>>>>>>>>50
250>>>>>>>>50
150>>>>>>>50
100>>>>>>50
80>>>>>50
60>>>>50
```

Measuring value ACT-temperature I

DEVICE AND METHOD FOR DISPLAYING MEASURING VALUES AS WELL AS SHRINK TUNNEL FOR A PACKAGING MACHINE AND PACKAGING MACHINE COMPRISING SUCH A DEVICE, RESPECTIVELY

The present invention relates to a device and to a method for displaying measuring values as well as to a shrink tunnel for a packaging machine and a packaging machine comprising such a device, respectively.

Analog displays and digital displays are known for displaying measuring values. For certain applications, it is required to display an actual value and a preset set value.

For example, a packaging machine comprising an integrated or connected shrink tunnel comprises a display device, with which the actual temperature prevailing in the shrink tunnel is displayed via an LED-7-segment display. If the operator wants to come to know the deviation from a preset set temperature, a switchover to the set temperate must thus take place by means of a keystroke. A display of a deviation from actual temperature to set temperature does not take place. As an alternative to an LED-7-segment display, the temperature is analogously displayed in a packaging machine comprising a shrink tunnel. As a general rule, digital displays, which comprise alphanumeric displays, are used as pure text displays.

It is furthermore known to display the actual temperature and the set temperature separately from one another and located next to one another, for example, respectively. A large deviation of the actual temperature from the set temperature is displayed by means of color-highlighting the actual temperature in the digital display.

Such a display device, however, also results in a problem to the effect that the value displayed in a numeric display is difficult to read in response to a rapid increase of the actual value due to the speed of the increase in value. The same also applies for the deviation of the actual value from the set value, which changes with the same speed.

It is the object of the invention to provide a device and a method for displaying measuring values as well as a shrink tunnel for a packaging machine and a packaging machine comprising such a device, respectively, which avoids the above-mentioned disadvantages and which enables a rapid and reliable detection of the display.

The object is solved by means of a device according to claim 1, by means of a method according to claim 7, a shrink tunnel according to claim 11 and by a packaging machine according to claim 13.

Developments of the invention are specified in the subclaims.

By means of linking the numeric measuring value with the local coordinate, at which said numeric value is displayed, it is possible with the device and the method according to the invention to read how high the measuring value is, solely from the position of the numerals, which represent the measuring value. The speed of the local movement of the measuring value thus corresponds to the speed of the change of the measuring value in the course of time. The advantage of a digital display, which lies in the high reading accuracy, is thus linked to the advantage of an analog display, which lies in the rapid detection of the display. The display device offers an advantage with reference to the visual detectability, not only in response to a rapid change of the actual value, but also in response to a slow change.

Figures 3, 4:
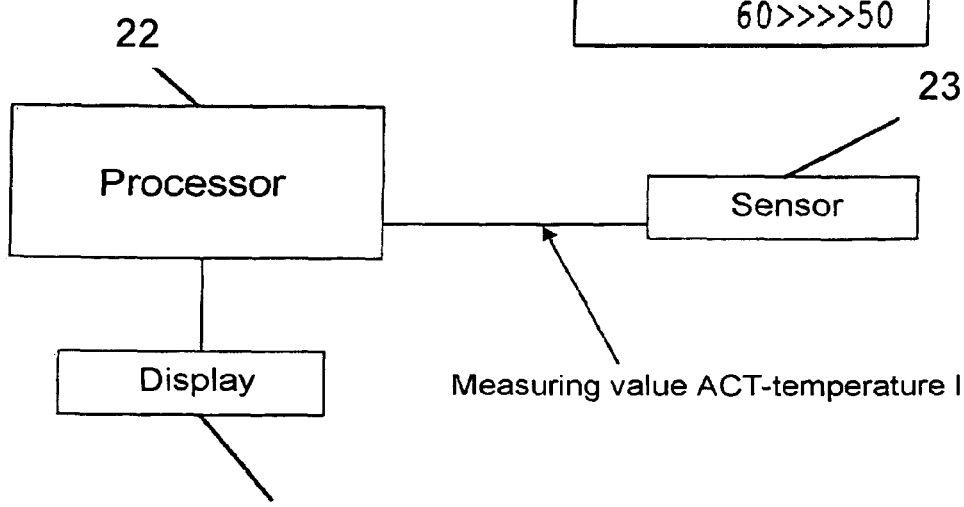

Further features and advantages of the invention result from the description of exemplary embodiments referring to the figures. In the figures it is shown:

FIG. 1 a schematic illustration of a packaging machine comprising a shrink tunnel comprising a device for displaying a measuring value according to the invention;

FIG. 2a a schematic view of a first embodiment of the device for displaying measuring values;

FIG. 2b a schematic view of a second embodiment of the device for displaying measuring values;

FIG. 2c a schematic view of a third embodiment;

FIG. 3 (a-d) further exemplary embodiments for the control of the display device;

FIG. 4 a schematic view of the control of the display device; and

Figure 5:
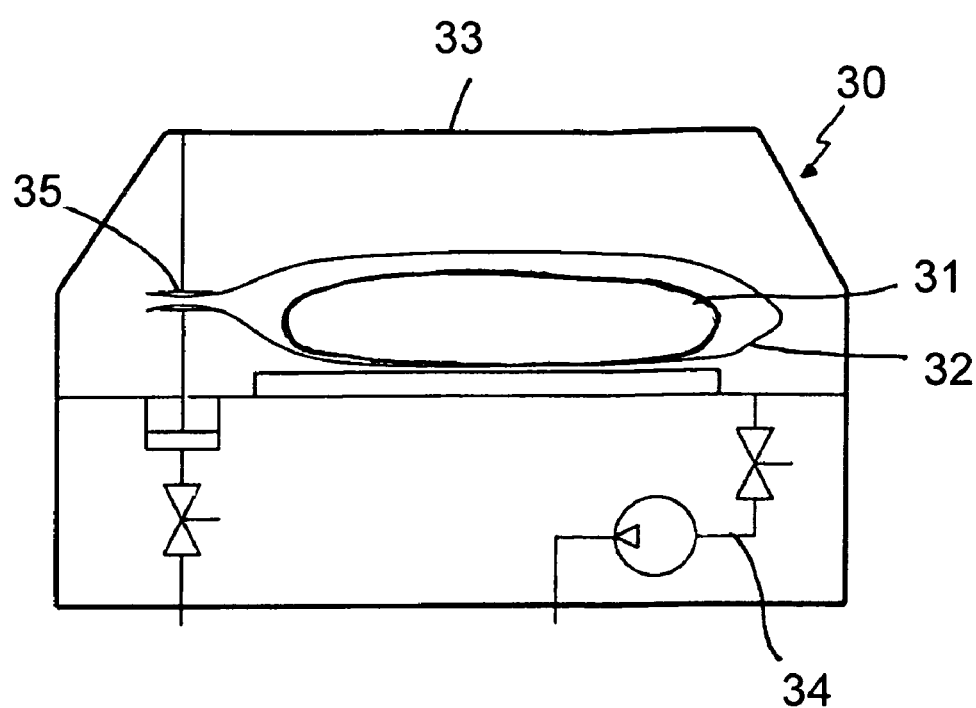

FIG. 5 a further example of a packaging machine.

A packaging machine comprising the device for displaying the temperature according to the invention will be described below with reference to FIG. 1 and FIG. 2.

As can be seen from FIG. 1, the packaging machine 1 illustrated in an exemplary manner comprises a forming and deep-drawing station 2, respectively, an evacuation and sealing station 3, a cutting station 4 and a shrink tunnel 5. At the input side an inlet for a lower film 7 is provided, which is guided from the input side through the stations to the end at the output side. A forming of containers 8 takes place in the forming station 2 in a known manner by means of deep-drawing. Said containers 8 are subsequently filled with the goods, which are to be packaged. In front of the input to the evacuation and sealing station 3, an upper film 10 is supplied to the upper side of the lower film 7, quasi as a lid for the containers 8. The upper film 10 is embodied as shrink film, for example. Alternatively, the upper film and the lower film can also be embodied as shrink film.

The deep-drawn package is evacuated and sealed in the evacuation and sealing station 3. After the separation in the cutting station 4, the sealed package is heated in the shrink tunnel 5 so that the upper film 10 shrinks and attaches tightly to the goods. The shrink tunnel 5 comprises a (not shown) heating device, which supplies heat to the package. Said heating device can be embodied as a contact heating surface or also as a radiation heating surface. The shrink tunnel can also be embodied as a shrink tank comprising a water curtain or a water bath, in which the package is located.

The heating device comprises a control, with which the heating device is controlled in such a manner that a preset set temperature S is adjusted.

The shrink tunnel 5 is provided with a device 20 for displaying the prevalent temperature in the shrink tunnel. The device 20 comprises a display 21, which, as can be seen from FIG. 4, is connected to a processor 22, which in turn is connected to a sensor 23. The sensor 23 detects the actual temperature I in the shrink tunnel.

The control 22, which is a microprocessor for example, is embodied in such a manner that the actual temperature I is detected by sensor 23 and is compared to a preset set value S, which is stored in the microprocessor, and a control deviation R=set value−actual value is then determined.

Figure 2:
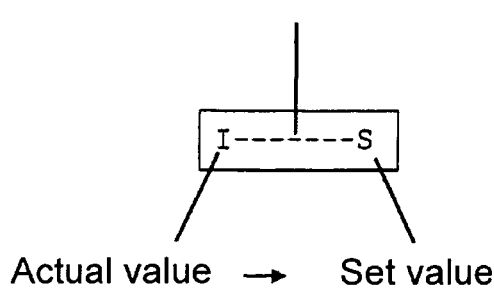
Figure 2:
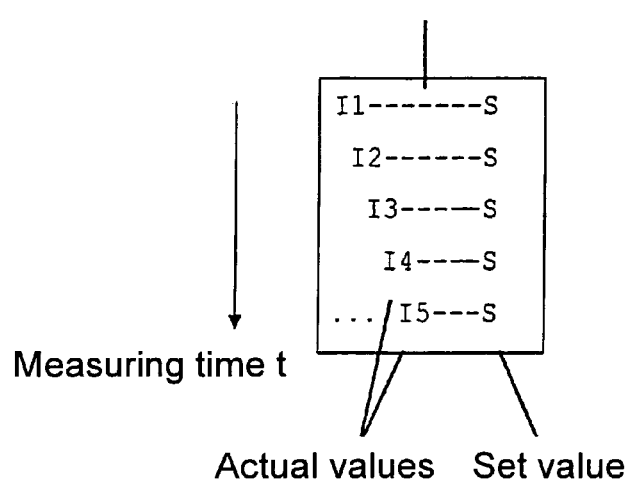
Figure 2:
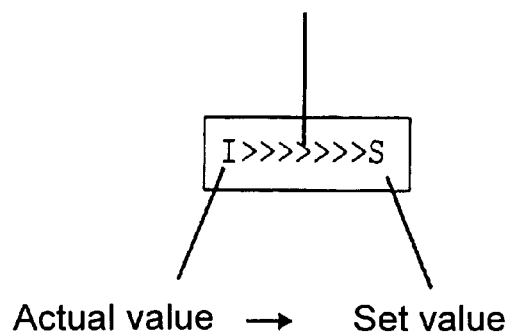

As can be seen from FIG. 2, the display 21 is embodied as a graphics-compatible LCD display, for example. The display 21 is controlled by the control 22. According to a first embodiment shown in FIG. 2a, the control is embodied in such a manner that the preset set value S is displayed in top view in the vicinity of the right-hand edge of the display and that the detected actual value I is displayed in the vicinity of the left-hand edge at the onset of the detection of the measuring value. The local distance of the displayed actual value I from the set value S corresponds to a control deviation at the measuring moment t. The distance of the actual value from the set value changes during the chronological course of the detection of the measuring value according to the detected control deviation at the respective measuring moment. During the course of the measurement, the actual value approaches the set value. The actual value as well as the control deviation are thus visually displayed at the same time, which allows for a particularly accurate and rapid detection, not only with the eye, but also with connected monitoring devices, for example a CCD camera. Once the actual value has reached the set value, both values coincide with another on the display and are displayed as one value.

The control is furthermore embodied in such a manner that the speed with which the detected control deviation of the actual value changes from the set value, corresponds to the movement speed of the alphanumeric display of the actual value.

As is illustrated in FIG. 2b, according to a preferred embodiment, the distance between the display of the actual value and of the set value is symbolized by means of arrows, the arrow direction of which displays the direction of the change of the control deviation.

In a further embodiment, which is shown in FIG. 2c, the control and the display are embodied in such a manner that the chronological change of the control deviation is displayed in lines of the display, which follow one below the other. At the moment $t_1$, the first line is displayed with a measuring value $I_1$, at the moment $t_i$, the i-th line is displayed with a measuring value $I_i$.

The number of the symbols on the display between the display of the number of the actual value and the number of the set value corresponds to fractions of the value of the control deviation. Each symbol, in the illustrated example each arrow, thus corresponds to a temperature interval. Any symbols can be used. For example, the control can also be embodied in such a manner that certain symbols are used for certain temperature intervals.

Further modifications are shown in FIG. 3a)-FIG. 3c) on the basis of a temperature detection in the unit ° Celsius. In FIG. 3a), the control is embodied in such a manner that the actual value I remains at the location when the control deviation is greater than a preset control deviation. However, the displayed value changes according to the measuring value. As soon as the actual value is closer to the set value than the preset control deviation, the actual value approaches the set value during the course of the measurement period.

In FIG. 3b), an arrow symbolizes a control deviation of 20 Celsius. A change in position of the actual value takes place only when the change of the control deviation is 20 Celsius or more.

In a further modification shown in FIG. 3c), the set value is at the left-hand side and the actual value approaches the set value from the right-hand side.

In a further modification shown in FIG. 3d), the control deviation is displayed in a logarithmic manner, in that the distance between actual value and set value changes logarithmically. The deviation can also be displayed by means of other non-linear displays.

During operation, a preset set temperature is adjusted for the shrink tunnel in the illustrated exemplary embodiment. The actual temperature is then detected and the deviation of the actual temperature from the set temperature is displayed on the display as described above. When the set temperature has been reached, both values coincide. The package then remains in the shrink tunnel for a preset time so that a shrinkage of the film takes place.

A further example of a packaging machine is schematically illustrated in FIG. 5 in the form of a chamber machine 30. The goods 31, which are to be packaged, are provided in a bag 32, which is evacuated in the chamber 33 of the machine via an evacuating device 34 and which is sealed by means of a sealing device 35 in the form of sealing rails. If necessary, the bag is filled with a gas prior to the sealing. The course of the vacuum during the evacuation as well as the temperature of the sealing rail can be displayed by means of the display device according to the invention. Due to the high demands on the quality of the packaging, in particular the sealing seam, when packaging medical goods, an accurate and easily detectable display is required. This is ensured by means of the display device according to the invention.

The term set value used in the description also comprises any other preset values. In particular, the set value itself can also be a measuring value.

The invention is not limited to the illustrated exemplary embodiment. The device for displaying measuring values can be used for any measuring values, for example for pressure, temperature, moisture, etc. The use is not limited to the use in a packaging machine. Furthermore, the display device can have multiple uses in a packaging machine, for example for the display of the temperature in the evacuation and sealing station, for the display of a fill level when filling the product, etc. For example, the low pressure can also be displayed in the evacuation and sealing station of a deep-drawing machine during the sealing process and/or the pressure of the gassing gas, such as $O_2$, $N_2$ or $CO_2$, can be displayed during a gassing process.

The display can also be embodied in a different manner. For example, an LED line can be used instead of a graphics-compatible LCD display.

The invention claimed is:

1. A device for displaying measuring values, the device comprising:
   a control unit;
   a measuring value detection unit; and
   a digital display unit, which is controlled by the control unit;
   wherein the control unit is structured and arranged such that a measuring value detected by the measuring value detection unit as an actual value and a preset set value are displayed on the display unit in such a manner that the position of the actual value relative to the set value is a function of the difference between the set value and the actual value, wherein one or more graphic elements, which the direction of the change of the difference between actual value and set value, are inserted between the display of the actual value and the display of the set value, and wherein the one or more graphic elements comprise one or more arrows.

2. The device according to claim 1, wherein the control unit is structured and arranged such that the distance between the actual value displayed on the display device and the displayed set value changes chronologically according to the difference between the set value and the actual value.

3. The device according to claim 2, wherein the control unit is structured and arranged such that the actual value approaches the set value in a line of the display device or moves away from the set value according to the difference between the set value and the actual value at the moment of the detection.

4. The device according to claim 2, wherein the control unit is structured and arranged such that the movement of the actual value relative to the set value takes place in one line or in a plurality of lines of the display unit.

5. The device according to claim 1, wherein the control unit is structured and arranged such that the display of the actual value and of the set value coincide at a difference between set value and actual value of zero.

6. A method for displaying measuring values, the method comprising:
    detecting a measuring value by a measuring value detection device; and
    digitally displaying an actual value, corresponding to the measuring value, and a set value, wherein the position of the actual value relative to the set value is displayed as a function of the difference between the actual value and the set value, wherein one or more graphic symbols, which characterize the direction of the change of the difference between set value and actual value, are arranged between the actual value and the set value, and wherein the one or more graphic symbols comprise one or more arrows.

7. The method according to claim 6, wherein the local distance between the actual value and the set value corresponds to the difference between the actual value and the set value.

8. The method according to claim 7, wherein the distance changes chronologically according to the actual value detected at a moment.

9. A shrink tunnel for a packaging machine, in particular, for a deep-drawing machine comprising a device for displaying measuring values according to claim 1.

10. The shrink tunnel according to claim 9, wherein the measuring value detection unit comprises a temperature measuring device, and wherein the device displays temperature values.

11. A packaging machine comprising a device for displaying measuring values according to claim 1.

12. The packaging machine according to claim 11, wherein the packaging machine is a deep-drawing machine or a chamber machine.

* * * * *

UNITED STATES PATENT AND TRADEMARK OFFICE
CERTIFICATE OF CORRECTION

PATENT NO. : 7,986,244 B2  Page 1 of 1
APPLICATION NO. : 12/150778
DATED : July 26, 2011
INVENTOR(S) : Bernd Jokele and Konrad Mossnang It is certified that error appears in the above-identified patent and that said Letters Patent is hereby corrected as shown below:

Column 4, Line 46, Claim 1:

After "which" insert -- display --.

Signed and Sealed this
Twenty-fifth Day of October, 2011

David J. Kappos
*Director of the United States Patent and Trademark Office*